United States Patent [19]
Yamaki

[11] Patent Number: 5,072,411
[45] Date of Patent: Dec. 10, 1991

[54] COMPUTER SYSTEM WHICH CAN OPERATE IN A PLURALITY OF DISPLAY MODES

[76] Inventor: Kazunori Yamaki, c/o Toshiba Corporation, Patent Division, 1-1-1, Shibaura, Minato-ku, Tokyo, Japan

[21] Appl. No.: 302,263

[22] Filed: Jan. 27, 1989

[30] Foreign Application Priority Data

Jan. 27, 1988 [JP] Japan ................... 63-14634

[51] Int. Cl.$^5$ ............................. G06F 15/62
[52] U.S. Cl. ..................... 395/162; 340/825.32; 395/700
[58] Field of Search ................. 364/581–523; 340/721, 723, 747–750, 825.32; 358/426

[56] References Cited

U.S. PATENT DOCUMENTS

| | | | |
|---|---|---|---|
| 4,639,721 | 1/1987 | Eto et al. | 340/748 X |
| 4,646,077 | 2/1987 | Culley | 340/750 X |
| 4,792,918 | 12/1988 | Hirase et al. | 364/900 |

Primary Examiner—Heather R. Herndon

[57] ABSTRACT

A computer system is provided which can be initialized in a condition to operate with one of a plurality of types of display controllers and display modes. The computer system includes a built-in display controller, a switch for enabling use of either the built-in display controller or an optional display controller, a random access memory (RAM) for storing setup data of the system, and a basic input/output system program (hereinafter system BIOS) for actuating the computer system in a condition to operate with a display controller to be selected by the user. The built-in display controller includes a read only memory (ROM) in which an identifier information is written. The system BIOS discriminates the type of the display controller which has been selected by the user by detecting whether or not the identifier information can be read. At lest one optional display controller can be connected to the computer system.

10 Claims, 2 Drawing Sheets

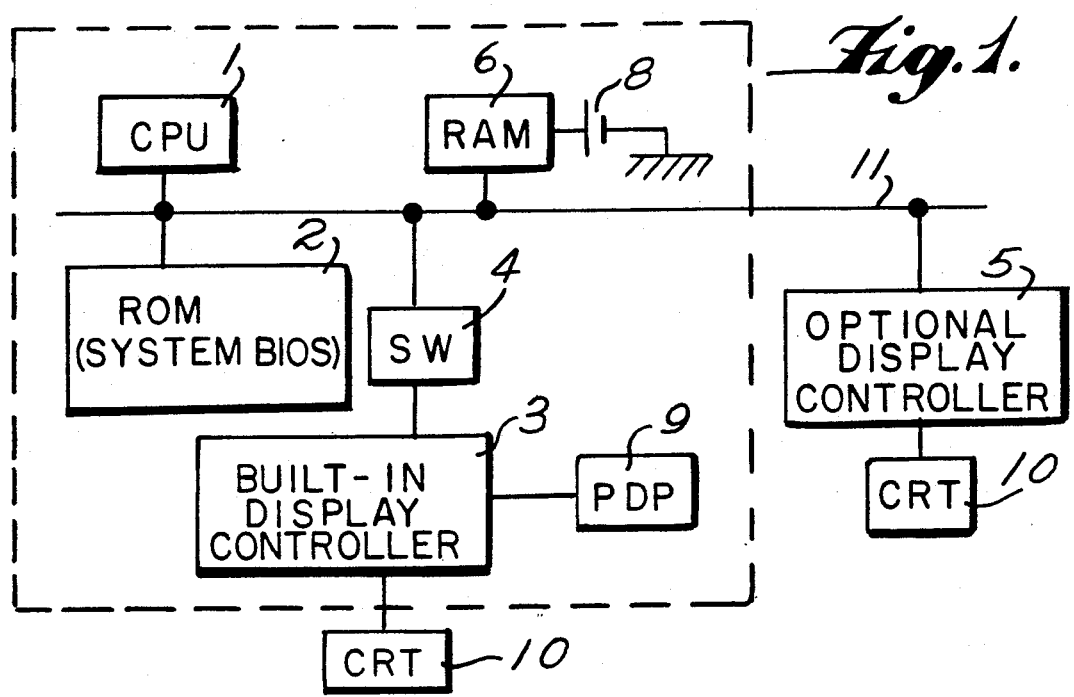
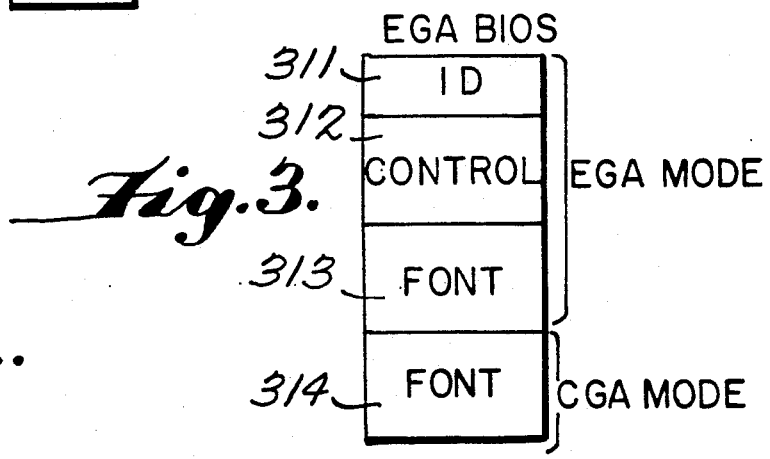
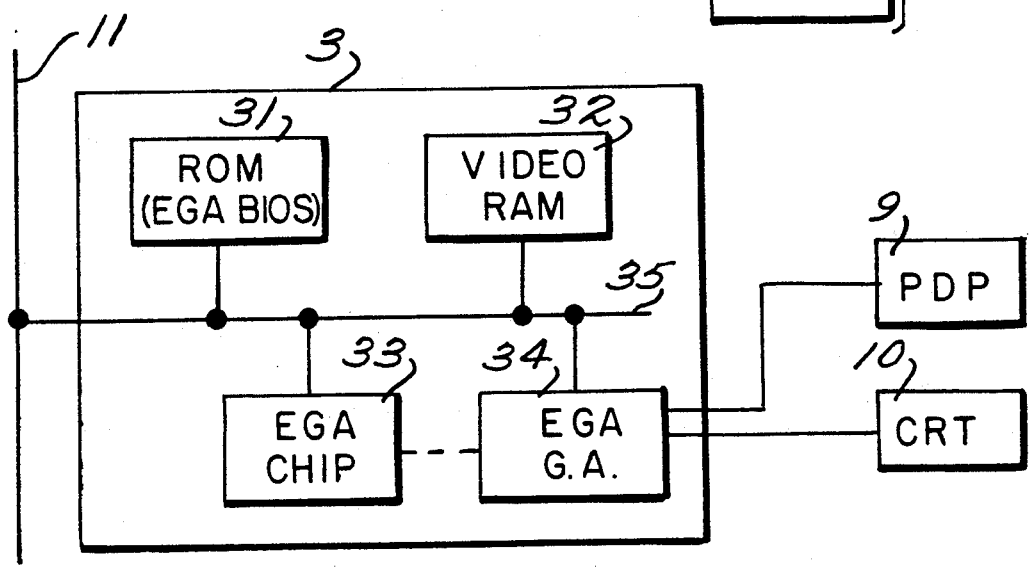

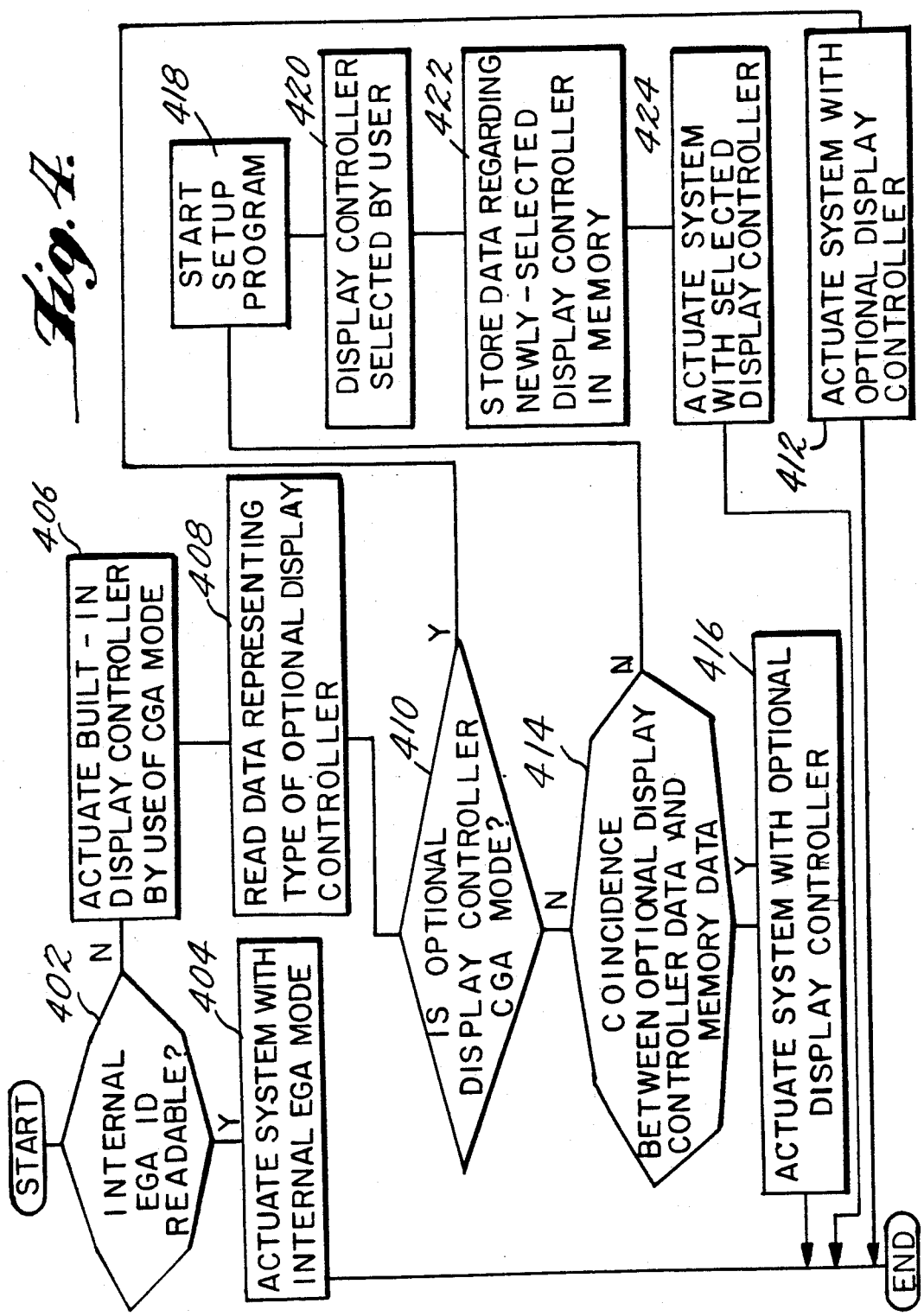

COMPUTER SYSTEM WHICH CAN OPERATE IN A PLURALITY OF DISPLAY MODES

BACKGROUND OF THE INVENTION (1) Field of the Invention

The present invention relates to a computer system to which display controllers of a plurality of types, such as those which may use a CGA (color graphics adapter) mode, an EGA (enhanced graphics adapter) mode, and a VGA (video graphics array) mode, are connectable.

(2) Description of Related Art

In recent years there have developed an increasing number of computer systems which include, or permit optional connection of, several types of display controllers (e.g., a CGA, an EGA, and a VGA), so as to achieve a display function of desired performance.

Display controllers using CGA, EGA, and VGA have the characteristics identified in Table 1 below.

TABLE 1

| Mode | Resolution | Color specification |
| --- | --- | --- |
| CGA | 640*200 dots | 4 colors |
| EGA | 640*350 dots | 16 colors can be displayed simultaneously out of 64 colors |
| VGA | 640*480 dots | 256 colors can be displayed simultaneously out of 260,000 colors |

The display controllers include chips which achieve the above specifications and basic input/output system (BIOS) programs supporting the chips.

In such a conventional computer system, the display controller which the user wants to use is selected from among available display controllers by operating a switch. Alternatively, the display controller can be selected through an input device (e.g., a keyboard) which the user operates as he is guided through a setup program or the like after the system has been turned on. However, if the display controller to be used is a different type from the display controller used last, the user must first determine all the display setup conditions, or designate a setup program to be executed.

Some of the conventional computer systems permit an optional display controller to be connected thereto, in addition to a built-in display controller, in such a manner that the optional display adapter is located either inside or outside of the main body of the computer systems. Even if the optional display controller is located within the main body, it is usual that the built-in display controller is automatically selected prior to the optional display controller. Therefore, when the computer system is actuated the user is not allowed to freely select the display controller which he or she wants to use.

SUMMARY OF THE INVENTION

The present invention has been developed in consideration of the above circumstances, and is intended to provide a computer system which permits the user to freely select either a built-in display controller or an optionally-provided display controller when the computer system is actuated. The invention automatically performs a setup operation in accordance with the operating condition of the system, and the computer system is actuated in a condition to operate with a display controller desired by the user.

In order to solve the problem mentioned above, the computer system of the present invention comprises: a built-in display controller for controlling a manner in which information is displayed, input means for allowing a user to enter a selection of one of the built-in display controller and an optional display controller, control means for sensing the selection entered by the user through the input means, and for actuating the computer system in a condition to operate with the selected one of the built-in display controller and an optional display controller.

The built-in display controller, the optional display controller, the memory, and the ROM (system BIOS) are connected to a CPU through a system bus.

BRIEF DESCRIPTION OF THE DRAWINGS

FIG. 1 is a block circuit diagram illustrating the construction of a computer system according to one embodiment of the present invention;

FIG. 2 is a block circuit diagram illustrating an example of the construction of the built-in display controller shown in FIG. 1;

FIG. 3 is an explanatory view showing the structure of the EGA BIOS program relating to FIG. 1; and FIG. 4 is a flow chart illustrating the operation of the present invention.

DESCRIPTION OF THE PREFERRED EMBODIMENT

A computer system according to the present invention will now be described in detail, with reference to the accompanying drawings.

FIG. 1 illustrates the construction of a computer system according to one embodiment of the present invention. Referring to FIG. 1, central processing unit (CPU) 1, read only memory (ROM) 2, manual switch 4, random access memory (RAM) 6, and optional display controller 5 are connected to system bus 11. Built-in display controller 3, having a conventional, well-known, structure is connected to system bus 11 through manual switch 4. The above-mentioned components can be centrally arranged within a main body. Plasma display 9, which is provided within the main body of the computer system, is connected to built-in display controller 3. Cathode ray tube (CRT) 10, which may be used as an external display remote from the main body, is connectable to optional display controller 5.

CPU 1 controls the operation of the computer system. ROM 2 stores a Basic Input Output System (system BIOS) which is a program to control the inputs and outputs of the computer system. The system BIOS input/output controls the execution of programs which enable operation at input and output devices connected to a system. Most of the input/output control programs (including a CGA BIOS) are stored in ROM 2 as a part of the system BIOS. The input/output programs of built-in display controller 3, when augmented to function in an EGA mode, a VGA mode, etc., are stored in ROM 31 (See FIG. 2) of display controller 3 as an optional BIOS. Switch 4 is a manual switch to be operated by the user. When this switch is on, identifier information in the EGA BIOS stored in ROM 31 of built-in display adapter 3 can be read. When the switch is off, the identifier information cannot be read.

The specific construction of built-in display adapter 3 is illustrated in FIG. 2. ROM 31 which stores an EGA BIOS, video random access memory RAM 32 which stores display data, EGA chip 33 which generates display signals suitable to plasma display (PDP) 9 and CRT 10, and EGA gate array 34 which controls the display functions of plasma display 9 and CRT 10 are connected to bus 35 of built-in display controller 3. Based on the EGA BIOS program, data is displayed on either PDP 9 or cathode ray tube (CRT) 10 under the control of CPU 1. As is shown in FIG. 3, the EGA BIOS includes: identifier information 311 provided only for an EGA display controller; control program 312 for the EGA; FONT data 313 for the EGA; and FONT data 314 for a CGA. Display controller "EGA" can perform the "CGA" function as well. The CGA is controlled by the system BIOS stored in ROM 2.

Built-in display controller 3 described with respect to FIGS. 2 and 3 is capable of the EGA mode, but is not limited thereto. For example, controller 3 can be made to operate in a VGA mode by incorporating a VGA chip, VGA gate array and a VGA BIOS.

Optional display controller 5 may be located either inside or outside of the main body of the system. The internal structure of optional display controller 5 is similar to that of built-in display controller 3. The user can freely determine the type of display controller from among the CGA mode, EGA mode, VGA mode, etc. CRT 10 is connected to optional display 5.

The setup information for the system is written in RAM 6. Battery 8 for backup use is connected to RAM 6.

The operation of the system will now be described, with reference to FIG. 4.

Either built-in display controller 3 (hereafter "DC 3") or optional display controller 5 (hereafter "DC 5") is selected beforehand by the user by means of switch 4. In response to this selection, the computer system determines whether or not the ID in built-in DC 3 is readable. When the system is turned on, CPU 1 receives a system actuation command and executes the following operation, under the control of the system BIOS stored in ROM 2.

First, at step 402 of the CPU 1 attempts to read the identifier information written in the BIOS of built-in DC 3, so as to determine whether, built-in DC 3 or optional DC 5, has been selected by the user. This identifier information is included in the EGA BIOS only. If the identifier information can be read, built-in DC 3 is regarded as having been selected. Accordingly, the system is actuated with built-in DC 3 at step 404.

If the identifier information cannot be read, optional DC 5 is regarded as having been selected. In this case, built-in DC 3 is temporarily actuated at step 406, using the CGA mode. Since, therefore, the display device of the computer system can be used, an error message or the like can be displayed. The CGA mode is actuated by the system BIOS stored in ROM 2.

Assuming the ID cannot be read, it is next checked whether or not optional DC 5 is a CGA mode at step 408. If it is found at step 410 that the optional DC 5 is a CGA mode, the system is actuated at step 412 with optional DC 5.

If it is found that optional DC 5 is not a CGA, information representing the type of optional DC 5 is read this information is derived on the basis of the memory capacity of the video RAM of optional DC 5. That is, the address space in which a video RAM in optional DC 5 is located is determined. For example, if the address space extends from $B8000_H$ to $BFFFF_H$ (16K bytes), it is clear that the optional DC 5 is a CGA mode, and if the address space extends from $AFFFF_H$ to $BFFFF_H$ (32K bytes), this is appropriate for EGA. Since the capacity of the video RAM differs depending upon the type of display controller, the capacity can be used for discriminating the type of the display controller. The capacity information thus read is compared with the setup information stored in system RAM 6 at step 414. If coincidence is detected in this comparison, the DC to be used is considered to be of the same type as the DC used last. In this case, the display of the system is actuated, using the same optional DC used last at step 416. If coincidence is not detected in the comparison at step 414, the DC to be used is considered to have been replaced with another or removed from the system. Since, in this case, a setup operation must be performed, execution of the setup program is commanded at step 418. There, the user selects at step 420 the type of the DC from among the EGA mode, VGA mode, etc., using the information indicated on the screen. In response to the section, information regarding the DC newly selected by the user is written in RAM 6 at step 422, and the display of the system is actuated at step 424, with the newly selected DC.

Although only a single preferred embodiment of this invention has been described in detail above, those skilled in the art will readily appreciate that many modifications are possible in the preferred embodiments without materially departing from the novel teachings and advantages of this invention. Accordingly, all such modifications are intended to be included in this invention as defined by the following claims.

What is claimed is:

1. A computer system which permits at least one optional display controller to be connected thereto for controlling a manner in which information is displayed, said computer system comprising:

a built-in display controller for controlling a manner in which information is displayed and including a memory storing identifier information for designating a type of the display controller;

input means for allowing a user to enter a selection of one of the built-in display controller and an optional display controller; and control means for sensing the selection entered by the user through the input means, and for causing the computer system to operate with the selected one of the built-in display controller and an optional display controller.

2. A computer system according to claim 1, further comprising:

an optional display controller connected to the computer system; and first memory means for storing setup information regarding the computer system; and said input means including switch means for enabling selection of one of the built-in display control means and the optional display control means; and said control means includes memory means for storing a system BIOS, which includes means for reading the ID of the built-in display control means; means for actuating the computer system, with the built-in display control means selected, if the ID is readable; means for actuating the built-in display control means by use of a CGA mode if the ID is not readable, and for discriminating the type of the optional display control means; means for comparing the setup information with information representing the type of the optional display control means; means for actuating the computer system, with the optional display control means selected, if coincidence is detected in the comparison; and means for executing a setup program if no coincidence occurs, and for actuating the system, with a type of display control means designated by user.

3. A computer system according to claim 2, wherein said input means further comprises switch means for enabling the user to manually select one of the built-in display controller and the optional display controller, and said control means further comprises second memory means, and a system basic input/output system program (hereinafter "system BIOS") stored in said second memory means, said system BIOS comprising:

identification means for reading the identifier information of the built-in display controller;

first actuating means for actuating the computer system in a condition to operate with the built-in display controller if the identifier of the built-in display controller is readable;

second actuating means for actuating the computer system in a condition to operate with the built-in display controller in a color graphics adapter CGA mode if the identifier of the built-in display controller is not readable, and for sensing a type of the optional display controller;

comparison means for comparing the setup information stored in the first memory means with information representing a type of the optional display controller, and for determining whether said setup information coincides with said optional display controller information;

actuating means for actuating the computer system in a condition to operate with the optional display controller if coincidence is detected by said comparison means; and setup means for executing a setup program if no coincidence is detected by said comparison means, and for actuating the system in a condition to operate with a type of display controller designated by the user.

4. A computer system according to claim 3, wherein the computer system is centrally arranged within a main body, and the optional display control means is disposed inside the main body of the computer system.

5. A computer system according to claim 3, wherein the computer system is centrally arranged within a main body, and the optional display control means is disposed outside of the main body of the computer system.

6. A computer system comprising:

a built-in display controller including a read only memory (ROM), and identifier information stored in said ROM for identifying a type of the display controller;

an optional display controller connected to the computer system and including a video random access memory (RAM); and processing means, and a system basic input/output system program (BIOS) to be executed by said processing means for controlling inputs and outputs in accordance with information stored within the computer system and supplied by a user, said system BIOS including:

means for reading the identifier information stored in the ROM of the built-in display controller when the computer system is started, and for actuating the computer system in a condition to operate with the built-in display controller if the identifier information can be read and the optional display controller if the identifier information cannot be read, means for checking the video RAM in the optional display controller to thereby discriminate a type of the optional display controller if the identifier information cannot be read, and means for comparing information representing the type of the optional display controller with the information supplied by the user, and actuating the system in a condition to operate with the optional display controller if coincidence is detected in the comparison, and permitting the user to supply new information if no coincidence is detected in the comparison, and actuating the system in accordance with the newly supplied environmental information.

7. A computer system according to claim 6, wherein the built-in display controller and processing means are centrally arranged within a main body, and the optional display controller is located inside the main body of the computer system.

8. A computer system according to claim 6, wherein the built-in display controller and processing means are centrally arranged within a main body, and the optional display controller controller is connective to, and located outside of, the main body of the computer system.

9. A computer system which permits selectabel operation with an optional display and display controller comprising:

a built-in display controller for controlling a first display in a first display mode;

a connection for an optional display controller for controlling a second display in a second display mode;

an input for allowing a user to enter a selection of one of the built-in display controller and a connected optional display controller when connected; and a control for automatically sensing the selected entered by the user, for discriminating the display mode of the selected controller and for causing the system to operate with the selected controller.

10. A system as in claim 9 wherein:

a selected controller includes a video random access memory; and the control discriminates the mode of the selected controller from the capacity of the controller video random access memory.

* * * * *